Patented July 11, 1944

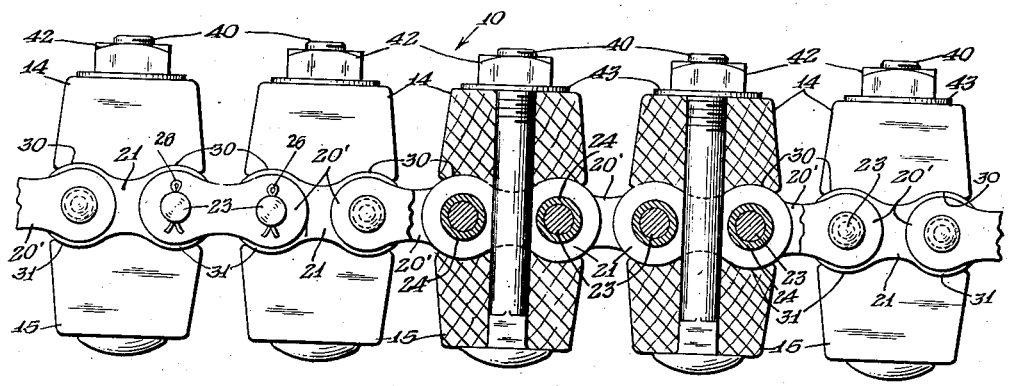

2,353,595

UNITED STATES PATENT OFFICE 2,353,595

DRIVING BELT

Albert F. Shields, Forest Hills, N. Y., assignor to
S & S Corrugated Paper Machinery Co., Inc.,
Brooklyn, N. Y., a corporation of New York Application September 25, 1941, Serial No. 412,219

4 Claims. (Cl. 74—236)

My invention relates to driving belts and, more particularly, to a type of belt peculiarly usable in variable speed drives.

Theretofore, in the construction of belts for use in variable speed drives, particularly drives of the "Reeves" type, the belts have been constructed in such a manner as to consist of a plurality of spaced driving elements which might come into contact with the pulleys of the variable speed drive, these elements being interconnected by strong canvas strips.

Such flexible interconnection by a fabric or canvas or other similar means was deemed necessary since the belt itself was required to be flexible in order to permit the driving element thereof to make an efficient contact with the pulleys.

However, in the course of ordinary operation of the variable speed drive and the constant shifting of the centers of rotation of the belt, as well as the constant changes in speed of rotation and frequent starting and stopping of movement of the belt, the canvas or other fabric used to interconnect the driving elements tended to stretch and loosen the belt. The power transmitting efficiency of the variable speed drive was thereby greatly reduced.

An important object of the present invention is the provision of a driving belt, particularly for a variable speed drive, wherein the driving elements on the belt itself are interconnected by rigid inflexible substantially inextensible members, the said members being, however, appropriately hinged in order to permit the belt as a whole to be flexible.

Another object of the present invention is the provision of a driving belt for a power transmission system wherein the belt consists of a plurality of spaced elements having pulley-contacting surfaces, the said elements being hingedly interconnected with respect to each other, but being rigidly spaced with respect to each other.

Another object of the present invention is the provision of a flexible but inextensible drive belt for a power transmission system.

Still another object of the present invention is the provision of a flexible but inextensible drive belt for a variable speed power transmission system of the "Reeves" type.

These and many other objects of my invention will, in part, be apparent and, where not apparent, pointed out in the following description and drawing, in which:

Figure 1 is a side view, partly in cross-section, of my novel belt.

Figure 1a is a cross-sectional view of one of the wood blocks of the belt, corresponding to an upper central portion of Figure 1.

Figure 2 is an end view showing the pulleys of a "Reeves" type variable speed power transmission system, showing also a partial cross-section of my belt.

Figure 3 is a side view of a portion of my belt, showing, however, a slightly modified form.

Figure 4 is a view in perspective showing a metal saddle which may be used in the modification of Figure 3.

Referring now to Figures 1 and 2, I have here shown my belt 10 and the mounting thereof between the pulleys 11, 11 of the variable speed drive 12.

It will be understood that, as the pulleys 11, 11 of the variable speed drive 12 are separated, the belt 10 approaches more closely toward the center of rotation of the pulleys and, while greater power may be transmitted to the belt, the belt is caused to move at a lower speed.

As the pulleys 11, 11 are brought closer together, the belt is forced upwardly away from the center of rotation of the pulleys and, hence, the speed of power transmission from the pulley to the belt is increased while the power transmitted is correspondingly decreased.

The opposite or driven pulley arrangement is exactly the same, except that the pulleys 11, 11 of the driven series separate when the driving pulleys are brought together and come together when the driving pulleys are separated.

The belt itself consists, as will be seen in Figure 2, of a series of spaced outer wooden blocks 14 and inner wooden blocks 15.

The wooden blocks have leather shoes 16, 16 at the ends thereof, in order to provide an efficient frictional surface so that proper driving power may be transmitted from the pulley to the belt.

Blocks 14 and 15 are mounted on chains 18, 19 and 20, as seen in Figure 2. Each chain, as is seen more particularly in Figure 1, consists of a plurality of plates 21, 21, interconnected by connecting links 20', 20'.

Each of the chains 18, 19 and 20 may be a standard roller chain with the rollers removed as unessential, for reduction of weight.

As is seen also in Figure 2, each section has a pair of plates 21, one on each side, which are interconnected by pins 23 and appropriately spaced by bushings 24 (see also Figure 1).

The pins are held in place and the connecting links are positioned on the ends of the pins in any suitable manner, as, for instance, by the cotter pins 26.

The connecting links 20' on each side of the plates 21 may rotate about the pins with respect to the plates 21 and, hence, each of the chains 18, 19 and 20 is a flexible member in the sense that each section thereof is rotatable with respect to the adjacent section.

The hardwood blocks 14 and 15 are as seen in the center portion of Figure 1 and in Figure 1a grooved at 30, 30 to provide a pair of part circular grooves extending longitudinally along the block and parallel to each other, the said grooves registering with the enlarged curved portion 31, 31 of each of the plates 21.

Blocks 14 and 15 are then secured to, for instance, chain 19 by a bolt 40 which passes through an opening 41 in block 15 then between the plates 21, 21 of the chain 19 and then passes through an opening in the block 14, the threaded end of the bolt projecting through the upper side of the block 14.

A nut 42 is secured over the threaded end and a washer 43 is placed between the nut 42 and the top of the block 14.

A similar bolt 40 is used to connect the blocks 14 and 15 to each of the other chains 18 and 19 so that each of the sets of blocks 14 and 15 is connected by bolts to the different chains.

All of the hardwood leather-surfaced blocks are connected to successive side plates of the chains in the manner thus described and are securely clamped by means of the bolts 40 on either side of the plates 21.

The rotation of the connecting link 20' with respect to the plates 21 of the chain is not inhibited by this bolting action since the grooves in the wood blocks register only with the outer edges of the side plates. The successive pairs of wood blocks are thus rotatable with respect to each other, and hence, the drive belt is as flexible as if a canvas or other fabric connector were used.

No elongation of the belt occurs under normal load conditions, and the only point of wear is at the pin and bushing. Therefore, the only extension of the belt which may occur is that which might arise from the wearing of the steel pins at the hinge connection between the side plates and the connecting links of the chain. Such wear will occur only after exceedingly long periods of use and will lead to much less extension of the belt than would occur should a canvas or other fabric connector be used between the drive blocks.

It will be obvious that the belt need not necessarily have three chains 18, 19 and 20, of the type described.

In appropriate cases, only one chain need be used. Or, if desired, two, three, four or more chains may be used.

In the ordinary variable speed power transmission systems, however, the use of three chains, I have found, provides the best positioning means for the hardwood blocks and thus permits the greatest efficiency in operation.

The chains, of course, are maintained in appropriate position between the blocks, since the bolts 40 pass between side plates and thus prevent the chain from moving with respect to the blocks.

Normally no wear should occur at the grooved surfaces 30, 30 of the blocks, since these surfaces are simply clamped down over the rounded edges 31, 31 of the plates 21 and have no movement with respect thereto.

In appropriate cases, however, I may, if desired, provide a metallic saddle 50 (see Figures 3 and 4) at the inner surface of each of the blocks 14 and 15.

The chain in the modification of Figures 3 and 4 will have exactly the same construction as that previously described.

Likewise, the blocks 14' and 15' will operate in exactly the same manner and will be bolted together on either side of the chain by bolts 40, nut 42 and washer 43.

Instead of having grooves 30, 30 on the inner side of the wood blocks in order to register with the outer edges of the side plates, however, the wood blocks 14' and 15' have plane inner surfaces 52, and 53.

An aluminum saddle 50 (Figure 4) is secured to the surfaces 53 and 52 of the inner side of the wood blocks 14' and 15'. This aluminum saddle is provided with an opening 60 through which the bolt may pass and with recesses 61 and 62 which will register with the surface of the bushing 24 which surrounds the pin 23 of the chain.

Should three chains be used in the manner shown in Figure 2, then three such saddles will be provided on the inner surface 52 and 53 of each of the blocks 14' and 15'. The saddle is arranged so that the sides 65 thereof are parallel to and adjacent the side plates 20' of the chain.

The recessed curved surfaces 61 and 62 register with and contact bushings 24 on the pins 23. Accordingly, when the blocks 14' and 15' are clamped together by the bolts 40 and nuts 42 on either side of the chain, the curved recesses 61 and 62 of the saddles 50 of each of the blocks register with the bushings 24 and are tightly secured thereto.

The pins rotate inside the bushings with respect thereto so that the tight securement of the recesses 61 and 62 of the saddle 50 on the bushings does not prevent free rotation of the connecting links 21 with respect to the side plates 20' which is the only factor necessary to ensure flexibility of the belt.

No possible wear of the wood can, in this case, occur. And, as a matter of fact, the aluminum saddles and the bushings cannot wear with respect to each other, since they are stationary with respect to each other. The only wear that can here occur is the wearing of the pin within the bushing, and since these may be hard metal members, such wear is at a minium.

Saddles 50 of this type may serve even more accurately to position the chain with respect to the blocks and provide a specific positioning means for the wood blocks.

However, I have found in actual practice that the construction hereinbefore described in Figures 1 and 2 produces the efficient results desired in variable speed drive mechanisms without the concomitant extension of the belt which previously has occurred.

In the foregoing I have described preferred modifications of my invention. Many variations of my invention should now be obvious to those skilled in the art.

Accordingly, I prefer to be bound, not by the specific disclosures herein, but only by the appended claims.

I claim:

1. A driving belt for a variable speed power transmission system, said belt comprising a plurality of sets of rigid blocks having a frictional surface and a metallic chain interconnecting said blocks, said chain comprising a plurality of metallic sections each hingedly connected together by metallic members, each set of blocks comprising an outer and an inner block mounted on opposite sides of one of said sections and secured thereto by clamping means interconnecting said blocks and forcing them together, each section comprising a pair of plates, and the connecting members comprising a connecting link connected to each plate at each end thereof; a pin passing through the pair of plates at one end thereof and the respective connecting links for each plate at said end, and a bushing on said pin between said plates, spacing said plates, and a similar pin connection and bushing spacer for the plates and connecting links at the other end of the plates; a saddle on the inner surface of each block, said saddle having recesses corresponding to and registering with said bushings.

2. A driving belt for a variable speed power transmission system, said belt comprising a plurality of sets of rigid wood blocks having a frictional leather surface and a metallic chain interconnecting said blocks, said chain comprising a plurality of metallic sections each hingedly connected together by metallic members, each set of blocks comprising an outer and an inner block mounted on opposite sides of one of said sections and secured thereto by clamping means interconnecting said blocks and forcing them together, each section comprising a pair of plates, and the connecting members comprising a connecting link connected to each plate at each end thereof; a pin passing through the pair of plates at one end thereof and the respective connecting links for each plate at said end, and a bushing on said pin between said plates, spacing said plates, and a similar pin connection and bushing spacer for the plates and connecting links at the other end of the side plates; a saddle on the inner surface of each block, said saddle having recesses corresponding to and registering with said bushings.

3. A driving belt for a variable speed power transmission system, said belt comprising a plurality of sets of rigid wood blocks having a frictional surface and a metallic chain interconnecting said blocks, said chain comprising a plurality of metallic sections each hingedly connected together by metallic members, each set of blocks comprising an outer and an inner block mounted on opposite sides of one of said sections and secured thereto by clamping means interconnecting said blocks and forcing them together, each section comprising a pair of plates, and the connecting members comprising a connecting link connected to each plate at each end thereof; a pin passing through the pair of plates at one end thereof and the respective connecting links for each plate at said end, and a bushing on said pin between said plates, spacing said side plates, and a similar pin connection and bushing spacer for the plate and connecting links at the other end of the plates; a metallic saddle on the inner surface of each block; said saddle having recesses corresponding to and registering with said bushings.

4. A driving belt for a variable speed power transmission system, said belt comprising a plurality of sets of rigid wood blocks having a frictional surface and a metallic chain interconnecting said blocks, said chain comprising a plurality of metallic sections each hingedly connected together by metallic members, each set of blocks comprising an outer and an inner block mounted on opposite sides of said sections and secured thereto by clamping means interconnecting said blocks and forcing them together, each section comprising a pair of plates, and the connecting members comprising a connecting link connected to each plate at each end thereof; a pin passing through the pair of side plates at one end thereof and the respective connecting links for each plate at said end, and a bushing on said pin between said plates, spacing said plates, and a similar pin connection and bushing spacer for the plates and connecting links at the other end of said plates; a metallic saddle on the inner surface of each block, said saddle having opposed recesses corresponding to and registering with said bushings and a spacing member between said recesses equal in length to the spacings between the bushings.

ALBERT F. SHIELDS.